United States Patent [19]

Böhm

[11] Patent Number: 4,517,823
[45] Date of Patent: May 21, 1985

[54] TESTING DEVICE FOR FLOWMETER

[75] Inventor: Jürgen Böhm, Mannheim-Wallstadt, Fed. Rep. of Germany

[73] Assignee: Bopp & Reuther GmbH, Mannheim, Fed. Rep. of Germany

[21] Appl. No.: 464,737

[22] Filed: Feb. 7, 1983

[30] Foreign Application Priority Data

Oct. 23, 1982 [DE] Fed. Rep. of Germany ....... 3239281

[51] Int. Cl.³ ............................................. G01F 25/00
[52] U.S. Cl. ............................................................. 73/3
[58] Field of Search ................................................ 73/3

[56] References Cited

U.S. PATENT DOCUMENTS

| 3,273,375 | 9/1956 | Howe | 73/3 |
| 3,492,856 | 3/1970 | Francisco | 73/3 |
| 4,372,147 | 2/1983 | Waugh | 73/3 |

Primary Examiner—S. Clement Swisher
Attorney, Agent, or Firm—Michael J. Striker

[57] ABSTRACT

A testing device for a flowmeter arranged in a pipe, has a bypass conduit connected with the pipe in which the flowmeter is arranged, a gauge container arranged in said bypass conduit and selectively connectable in series with the pipe, an element for selectively connecting said gauge container in series with the pipe, a measuring piston displaceable under the action of a fluid which flows into said gauge container over a measuring section having a beginning and an end, start and stop switches arranged at the beginning and at the end of the measuring section, respectively, and operative for starting and stopping of addition of electric impulses from the flowmeter during displacement of said measuring piston, a device for comparing the impulses being added with a gauge volume of the measuring section, and a measuring cylinder located in the interior of the gauge container, the measuring cylinder forming the measuring section and carrying the start and stop switches and the measuring piston, said gauge container and said measuring cylinder forming therebetween a pressure equalizing chamber.

12 Claims, 1 Drawing Figure

U.S. Patent
May 21, 1985
4,517,823
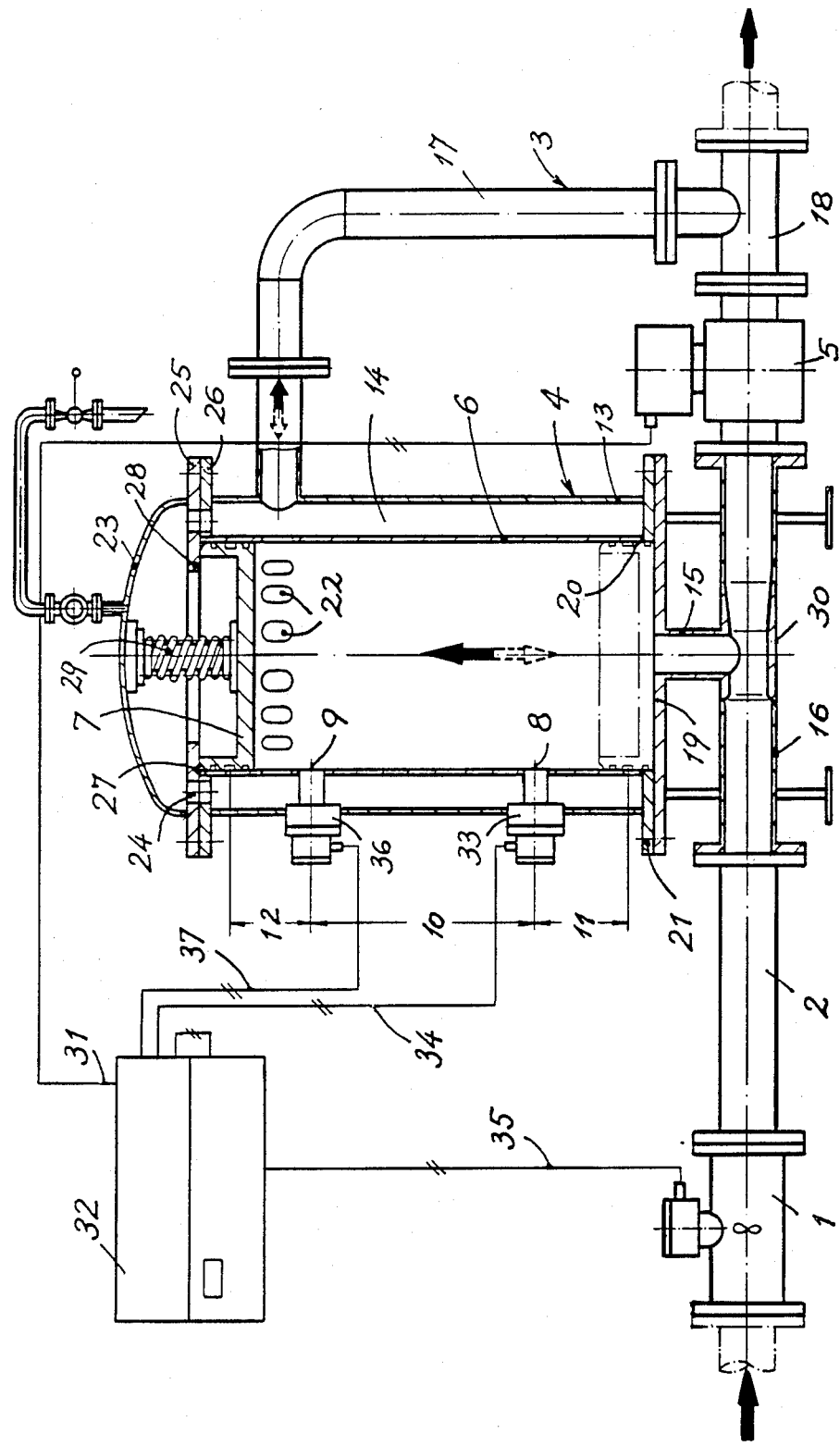

TESTING DEVICE FOR FLOWMETER

BACKGROUND OF THE INVENTION

The present invention relates to a testing device for a flowmeter. More particularly, it relates to a testing device for a flowmeter which is fixedly arranged in a pipe, particularly for high medium pressure.

Testing devices of the above mentioned general type are known in the art. In a known testing device for testing a flowmeter arranged in a pipe there is provided a cylindrical gauge container which is selectively switchable by a valve to be connected in series with the flowmeter. The gauge container is provided with a start switch and a stop switch at the beginning and in the end of the measuring section, so that when a measuring piston which is displaced in the gauge container by the fluid to be measured passes the respective switch the adding of electrical impulses of the flowmeter starts or stops so as to provide comparison of the added impulses with the gauge volume of the measuring section. One such testing device is disclosed, for example, in the German Auslegeschrift No. 1,249,547, and particularly in FIG. 5. This testing device is, however, not suitable for high medium pressure, since it is unavoidable that the wall of the gauge container elastically expands under the action of the high medium pressure whereby the gauge volume increases and the test results become false. Moreover, the valve arrangement for directing the fluid flowing in the pipe into the gauge container provided in the bypass conduit is composed of several check valves which are arranged in the bypass conduit before and after the gauge container and of a check valve seated in the pipe. Thereby the testing device is structurally very expensive, and a considerable time is required for deflecting the medium flow through the gauge container. Moreover, since the start and stop probes correspond to raising fluid level in the gauge container, the pressure medium must leave the gauge container prior to each testing step. Therefore an additional discharge valve with a discharge line is required and an emptying time which considerably delays the testing step must be taken into consideration. In addition the gas or air located above the fluid level in the gauge container is pressed into the pipe, whereby the conveyed medium is mixed in undesirable manner with the gas or air. Also, the raising fluid level in the gauge container is not quiet because of the flow movement of the fluid and thereby the switching point for the start and stop of the testing process is not accurate.

The German Auslegeschrift No. 1,249,547 discloses in its FIG. 1 a testing device in which the measuring section is provided in a longitudinal measuring pipe with a measuring piston which is displaced by the fluid to be measured from its one end position to its other end position. A start switch is arranged in the beginning of the measuring section in the measuring pipe, and a stop switch is mounted in the end of the measuring section. They are actuated during movement of the measuring piston and start or stop the adding of the throughflow impulses. This testing device is also not suitable for high medium pressure, inasmuch as the wall of the measuring pipe can also elastically expand under the action of high pressure, whereby the gauge volume of the measuring section is abnormally increased. Moreover a leakage between the measuring piston and the pipe wall because of the expansion is counted here, which also results in visible volume increase and thereby a measuring error. The bypass conduit can remain filled by the intermediate switching of the measuring piston which displaces in the measuring pipe. However, here a row of check valves is required, and additionally also several change-over switches are needed to supply the measuring fluid in the bypass conduit from the desired side in the measuring pipe which operates in both directions. Thereby considerable pressure shocks in the conduit can take place when the valves operate not synchronously.

SUMMARY OF THE INVENTION

Accordingly, it is an object of the present invention to provide a testing device for a flowmeter which avoids the disadvantages of the prior art.

More particularly, it is an object of the present invention to provide a testing device for a flowmeter, which eliminates measuring errors in the event of high medium pressures and provides switching of the fluid flow to be measured from a pipe to a bypass conduit, and vice versa, with a minimum structural means in a simple, fast and reliable manner.

In keeping with these objects and with others which will become apparent hereinafter, one feature of the present invention resides, briefly stated, in a testing device which has a gauge container selectively connectable with a pipe in which a flow meter is arranged, with a measuring piston displaceable under the action of a fluid flow and with start and stop switches arranged in the beginning and in the end of a measuring section and operative for starting or stopping of addition of electric impulses from the flowmeter during the displacement of the measuring piston, wherein a measuring cylinder is provided inside the gauge cylinder and forms the measuring section and also carries the start and stop switches and the measuring piston, so that the gauge container and the measuring cylinder form therebetween a pressure equalizing chamber.

Since the measuring cylinder forming the measuring section and having the measuring piston and start and stop switches is arranged in the gauge container and forms together with the latter a pressure equalizing chamber, the measuring cylinder wall is subjected to identical pressure from inside and from outside, so that it is located in the gauge container in a pressureless manner. Also in the event of high conduit pressure, an elastic expansion of the measuring cylinder wall and thereby an increase of the measuring volumes determined by the measuring section are reliably prevented. The measuring cylinder and the gauge container may be thereby formed as a thin-walled elements. Because of the shape-correct formation of the measuring cylinder wall, no leakage losses between the measuring piston and the cylinder wall take place, so that the testing devices provides for all media pressures a high measuring accuracy.

In accordance with another feature of the present invention, the means for selectively connecting the gauge container with the pipe include only one shut-off valve arranged between two connecting points in which the pipe with the flowmeter is connected with the bypass conduit. Since the valve means has only one shut-off valve located between the connecting points of the pipe with the bypass conduit, the switching of the fluid flow to be measured from the pipe to the gauge container mounted in the bypass conduit, as required for the testing process, is carried out with minimum structural means and in the shortest time by actuation of this one valve. By opening this valve, the fluid flow flows exclusively through the pipe, inasmuch as in accordance with yet another feature of the present invention the measuring piston which glides in the measuring cylinder wall inside the gauge container moves automatically back to its initial position under the action of its own weight and/or under the action of the differential pressure means and thereby the bypass conduit is blocked.

An especially advantageous arrangement of the measuring cylinder in the gauge cylinder takes place when in accordance with a further feature of the present invention the inlet end of the measuring cylinder is sealed relative to the pressure equalizing chamber of the gauge cylinder, the entire fluid quantity flowing in the bypass conduit travels through the measuring cylinder and thereby in the region of the measuring section acts in displacement sense upon the measuring piston. In connection with the open mouth of the outlet end of the measuring cylinder in the pressure equalizing chamber of the gauge container from which the outlet portion of the bypass conduit branches, the pressure equalization of the measuring cylinder is made possible in a simple manner and the fluid flow can pass the gauge container and the bypass conduit over a shorted path and thereby in a flow-favorable condition.

A further feature of the present invention is that the measuring cylinder which in a known manner is provided with the measuring section between the start and stop switches as well as with the starting section and the finishing section prior to and after the latter, has in the region of the finishing section a plurality of openings. The fluid which is displaced by the measuring piston and flows through the measuring cylinder can be directly laterally discharged through the openings into the pressure equalizing chamber and from the latter into the bypass conduit, so that a sufficiently high fluid throughput is guaranteed.

Yet a further feature of the present invention is that the measuring cylinder is provided at its outlet end with an inwardly projecting stroke-limiting edge. Thereby a stop for the measuring piston is provided in a simple manner.

Another feature of the present invention is that the container cover has a damping spring for the measuring piston. As a result of this, the movement for the measuring piston is actively braked shortly before its meeting with the stroke limiting edge.

In accordance with an additional feature of the present invention, a reliable automatic return of the measuring piston to its initial position is performed when a venturi-like tubular constriction is provided in the pipe in the connecting region of the inlet portion of the bypass conduit. As a result of this, a small pressure difference takes place between the inlet portion and the outlet portion of the bypass conduit. This small pressure difference is sufficient with the open shut-off valve, to produce required return flow in the bypass conduit for returning the measuring piston to its initial position.

It is advantageous when the gauge cylinder and the measuring cylinder are arranged normal and are mounted with their lower inlet end in the bypass conduit. Thereby the inherent weight of the measuring piston alone, or in connection with the pressure differential means, provides return of the measuring piston after the testing step automatically to its initial position.

When in accordance with still a further feature of the present invention the length of the starting section of the measuring cylinder is determined upon the closing time of the shut-off valve, it is guaranteed that the start switch is first passed by the measuring piston when the direct passage through the pipe is absolutely blocked. The starting section of the measuring cylinder can be shortened if the shut-off valve is formed, in accordance with another feature of the present invention, as a quick closure valve.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a view schematically showing a testing device for a flow meter in accordance with the present invention.

DESCRIPTION OF A PREFERRED EMBODIMENT

A flowmeter 1 to be tested is fixedly mounted in a pipe 2 through which a medium to be measured flows. An inventive testing device for the flow meter 1 has a cylindrical gauge container 4 which is arranged in a bypass conduit 3 of the pipe 2 normal to the latter. After closing of a shut-off valve 5, the fluid in pipe 2 flows from below upwardly through the gauge container 4 and thereby the gauge container 4 becomes connected with the flowmeter 1 in series.

The gauge container 4 is provided in its interior with a measuring cylinder 6 and a measuring piston 7 which displaces inside the latter. The measuring cylinder 6 defines a measuring section 10 between a start position 8 and a stop position 9, with the gauge volume to be displaced. The measuring section 10 in the measuring cylinder 6 is adjoined by a start section 11 located before the measuring section 10, and by a finishing section 12 located behind the measuring section 10, for the measuring piston 7. A pressure equalizing chamber 14 is formed between a wall 13 of the gauge container 4 and the measuring cylinder 6.

For communicating the bypass conduit 3 with the pipe 2, an inlet portion 15 of the bypass conduit is connected with a pipe portion 16 provided with a flange, and an outlet portion 17 of the bypass conduit 3 is connected with a branch pipe 18 with the aid of flanges. The shut-off valve 5 is arranged with its flanges between the pipe portion 16 and the branch pipe 18, so that a connecting section composed of three successive pipe pieces 16, 5 and 18 is available for the testing device to be introduced into the pipe 2.

The inlet portion 15 of the bypass conduit 3 is fixedly mounted in a bottom 19 of the gauge container 4 and opens freely from below into the interior of the measuring cylinder 6. A lower edge of the measuring cylinder wall 6 is tightly connected at a connecting location 20 with a bottom flange 21 of the container wall 13. At the top, in the region of the finishing section 12, the measuring cylinder 6 has a plurality of openings 22 distributed over its circumference. The fluid displaced by the measuring piston 7 can laterally flow through the openings 22 into the pressure equalizing chamber 14 and then flow from the pressure equalizing chamber 14 into the outlet portion 17 of the bypass conduit 3. The fluid also exits upwardly from the interior of the measuring cylinder 6 in such a manner that it is deflected downwardly at a curved container cover 23 and flows via openings 24 in a cover flange 25 and in an upper container flange 26 into the pressure equalizing chamber 14 and further into the outlet portion 17 of the bypass conduit 3.

The measuring cylinder 6 is mounted concentrically at an upper connecting location 27 by the upper container flange 26 and at the lower connecting location 20 by the lower container flange 21. An elastic intermediate member can be inserted at the connecting locations 20 and 27 between the measuring cylinder walls 6 and both container flanges 21 and 26 so as to prevent transfer of a possible expansion of the gauge cylinder 4 to the measuring cylinder 6.

The cover flange 25 of the container cover 23 extends inwardly beyond the measuring cylinder 6 so as to form a stroke-limiting edge 28 for the measuring piston 7. For providing a soft touch of the measuring piston 7 against the stroke-limiting edge 28, a damping spring 29 is provided in the container cover 23. The pipe portion 16 inserted in the pipe 2 has in the region of branching-off the inlet portion 15 of the bypass conduit a venturi-like tubular constriction 30 which forms a differential pressure element for the return movement of the measuring piston 7 into the starting position.

The testing device in accordance with the present invention operates in the following manner:

In the beginning of the testing process, the shut-off valve 5 is open so that the fluid flows directly through the pipe 2. The measuring piston 7 is located in its starting position shown in broken lines. The piston automatically assumes under the action of its own weight and under the action of the return flow which takes place in the bypass conduit 3 because of the pressure differential generated at the constriction 30. The measuring piston 7 thereby blocks the throughflow through the bypass conduit 3. The testing process is started with closing of the shut-off valve 5 via a control line 31 from an evaluating device 32, so that upon reaching of the valve closing position all fluid passing through the flowmeter 8 flows through the bypass conduit 3 andthrough the gauge container 4. The fluid flows via the inlet portion 15 into the measuring cylinder and displaces the measuring piston 7 in the region of the starting section 11 upwardly to the start position 8. Within this start section 11, the shut-off valve 5 must move to its closed position. During passing the start position 8, a start switch 33 reacts and releases via a control line 34 the adding in the evaluating device 32 of throughflow impulses coming via an impulse line 35 from the flowmeter 8.

After passing the measuring section 10, or in other words after displacement of the container gauge volume, the measuring piston 7 reaches the stop position 9 in which a stop switch 36 interrupts via a control line 37 the adding in the evaluating device 32 the throughflow impulses coming from the flowmeter 8. Simultaneously, the opening of the shut-off valves 5 is performed via the control line 31 automatically from the evaluating device 32. During the valve opening process the measuring piston 7 is displaced further upwardly over the region of the finishing section 12. The piston movement is damped during passing the openings 22 of the measuring cylinder 6 because of the small discharge cross section of the cover opening 24. Before meeting with the stroke-limiting edge 28, the measuring piston 7 is softly braked by the damping spring 29.

In the evaluating device 32 the fluid quantity obtained from the added throughflow impulses of the flowmeter 8 to be tested is compared with the displaced gauge volume of the measuring section 10 and a measuring error is indicated. With the completely open shut-off valve 5, the flow takes place directly via the insert section 16, 5 and 18 of the pipe 2 and the measuring piston 7 travels due to its own weight slowly again to its lower starting position. The venturi-like tubular constriction 30 releases because of the pressure differential a return flow in the bypass conduit 3 which considerably supports the return movement of the measuring piston 7. The shut-off valve 5 is formed as a quick closure valve, whereby the length of the starting section 11 and the finishing section 12 can be maintained as short as possible.

It will be understood that each of the elements described above, or two or more together, may also find a useful application in other types of constructions differing from the types described above.

While the invention has been illustrated and described as embodied in a testing device for a flowmeter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A testing device for a flowmeter arranged in a pipe, comprising
   a bypass conduit connected in two connecting points with the pipe in which the flowmeter is arranged;
   a gauge container arranged in said bypass conduit and selectively connectable in series with the pipe;
   means for selectively connecting said gauge container in series with the pipe and including only one shut-off valve arranged between said two connecting points;
   a measuring piston displaceable under the action of a fluid which flows into said gauge container over a measuring section having a beginning and an end, said measuring piston being arranged so that when said shut-off valve is open said measuring piston automatically displaces back to its start position under the action of its own weight;
   start and stop switches arranged at the beginning and at the end of the measuring section, respectively, and operative for starting and stopping of addition of electric impulses from the flowmeter during displacement of said measuring piston;
   means for comparing the impulses being added with a gauge volume of said measuring section; and
   a measuring cylinder located in the interior of said gauge container, said measuring cylinder forming said measuring section and carrying said start and stop switches and said measuring piston, said gauge container and said measuring cylinder forming therebetween a pressure equalizing chamber.

2. A testing device as defined in claim 1; and further comprising differential pressure means, said measuring piston being arranged so that when said check valve is open said measuring piston displaces back to its start position under the action of the own weight of said measuring piston and of said differential pressure means.

3. A testing device for a flowmeter arranged in a pipe, comprising a bypass conduit connected with the pipe in which the flowmeter is arranged;

a gauge container arranged in said bypass conduit and selectively connectable in series with the pipe;

means for selectively connecting said gauge container in series with the pipe;

a measuring piston displaceable under the action of a fluid which flows into said gauge container over a measuring section having a beginning and an end; a cover for said gauge container; a damping spring arranged in said cover for damping the displacement of said measuring piston;

start and stop switches arranged at the beginning and at the end of the measuring section, respectively, and operative for starting and stopping of addition of electric impulses from the flowmeter during displacement of said measuring piston;

means for comparing the impulses being added with a gauge volume of said measuring section; and a measuring cylinder located in the interior of said gauge container, said measuring cylinder forming said measuring section and carrying said start and stop switches and said measuring piston, said gauge container and said measuring cylinder forming therebetween a pressure equalizing chamber.

4. A testing device for a flowmeter arranged in a horizontal pipe, comprising a bypass conduit connected with the pipe in which the flowmeter is arranged and having a vertical inlet portion with which the horizontal pipe is connected in a connecting region;

a gauge container arranged in said bypass conduit and selectively connectable in series with the pipe;

means for selectively connecting said gauge container in series with the pipe;

a measuring piston displaceable under the action of a fluid which flows into said gauge container over a measuring section having a beginning and an end;

start and stop switches arranged at the beginning and at the end of the measuring section, respectively, and operative for starting and stopping of addition of electric impulses from the flowmeter during displacement of said measuring piston;

means for comparing the impulses being added with a gauge volume of said measuring section;

a measuring cylinder located in the interior of said gauge container, said measuring cylinder forming said measuring section and carrying said start and stop switches and said measuring piston, said gauge container and said measuring cylinder forming therebetween a pressure equalizing chamber; and differential pressure means which is formed as a permnently open venturi-like tubular constriction in the connecting region, said vertical inlet portion being directly connected with a constricted region of said tubular constriction.

5. A testing device for a flowmeter arranged in a pipe, comprising a bypass conduit connected with the pipe in which the flowmeter is arranged;

a gauge container arranged in said bypass conduit and selectively connectable in series with the pipe;

means for selectively connecting said gauge container in series with the pipe;

a measuring piston displaceable under the action of a fluid which flows into said gauge container over a measuring section having a beginning and an end;

start and stop switches arranged at the beginning and at the end of the measuring section, respectively, and operative for starting and stopping of addition of electric impulses from the flowmeter during displacement of said measuring piston;

means for comparing the impulses being added with a gauge container, said measuring cylinder forming said measuring section and carrying said start and stop switches and said measuring piston, said gauge container and said measuring cylinder forming therebetween a pressure equalizing chamber, said gauge container and said measuring cylinder being arranged in a vertical direction and connected at their lower inlet side with the pipe.

6. A testing device as defined in claim 5, wherein said bypass conduit is connected with the pipe in two connecting points, said means for selectively connecting said gauge container with the pipe including only one check valve arranged between said two connecting points.

7. A testing device as defined in claim 6; and further comprising differential pressure means, said measuring piston being arranged so that when said check valve is open said measuring piston displaces back to its start position under the action of said differential pressure means.

8. A testing device as defined in claim 5, wherein said measuring cylinder has inlet and outlet ends and is held at its ends concentrically to said gauge container, said inlet end of said measuring cylinder being sealed from said pressure equalizing chamber, whereas said outlet end of said measuring cylinder is open into the latter, said bypass conduit having an outlet portion branching from said pressure equalizing chamber.

9. A testing device as defined in claim 5, wherein said measuring cylinder has a starting section located before said start switch and a finishing section located after said stop switch, said measuring cylinder having a wall provided with a plurality of openings in the region of said finishing section.

10. A testing device as defined in claim 5, wherein said measuring cylinder has an outlet end and is provided at said outlet end with a stroke-limiting edge to limit the displacement of said measuring piston.

11. A testing device as defined in claim 6, wherein said measuring cylinder has a starting section before said start switch, said starting section having a length which is determined by a closing time of said check valve.

12. A testing device as defined in claim 6, wherein said check valve is formed as a quick closure valve.

* * * * *